(12) United States Patent
Shiomura et al.

(10) Patent No.: US 11,853,510 B2
(45) Date of Patent: Dec. 26, 2023

(54) SYSTEM AND METHOD FOR TOUCH-TO-DISPLAY NOISE MITIGATION

(71) Applicant: Synaptics Incorporated, San Jose, CA (US)

(72) Inventors: Masaaki Shiomura, Tokyo (JP); Daisuke Ito, Tokyo (JP); He-Wei Li, Guangdong Shen (CN)

(73) Assignee: Synaptics Incorporated, San Jose, CA (US)

( * ) Notice: Subject to any disclaimer, the term of this patent is extended or adjusted under 35 U.S.C. 154(b) by 88 days.

(21) Appl. No.: 17/525,846

(22) Filed: Nov. 12, 2021

(65) Prior Publication Data

US 2023/0152925 A1 May 18, 2023

(51) Int. Cl.
*G06F 3/041* (2006.01)
*G06F 3/044* (2006.01)

(52) U.S. Cl.
CPC .......... *G06F 3/04184* (2019.05); *G06F 3/044* (2013.01); *G06F 3/04166* (2019.05)

(58) Field of Classification Search
CPC ... G06F 3/044; G06F 3/04166; G06F 3/04184
See application file for complete search history.

(56) References Cited

U.S. PATENT DOCUMENTS

| 10,496,229 | B2* | 12/2019 | Song | G06F 1/3262 |
|---|---|---|---|---|
| 11,592,937 | B1* | 2/2023 | Shiomura | G06F 3/04182 |
| 2016/0077617 | A1* | 3/2016 | Lee | G06F 3/04184 |
| | | | | 345/173 |
| 2022/0121298 | A1* | 4/2022 | Ding | H03G 3/344 |
| 2023/0089160 | A1* | 3/2023 | Losh | G06F 3/04184 |
| | | | | 345/173 |
| 2023/0099369 | A1* | 3/2023 | Vaze | G06F 3/04182 |
| | | | | 345/174 |
| 2023/0100129 | A1* | 3/2023 | Vaze | G06F 1/3262 |

* cited by examiner

*Primary Examiner* — Michael Pervan
(74) *Attorney, Agent, or Firm* — Leydig, Voit & Mayer, Ltd.

(57) ABSTRACT

Driving a display of an input-display device includes generating, during a first display frame, a first touch sensing waveform to be applied to a touch screen of the display, and generating, during a second display frame, a second touch sensing waveform to be applied to the touch screen. The first touch sensing waveform generates on the display a first touch-to-display noise pattern of touch-to-display noise artifacts. The second touch sensing waveform generates on the display a second touch-to-display noise pattern of touch-to-display noise artifacts. The second touch-to-display noise pattern mitigates the first touch-to-display noise pattern.

20 Claims, 7 Drawing Sheets

SYSTEM AND METHOD FOR TOUCH-TO-DISPLAY NOISE MITIGATION

TECHNICAL FIELD

The described embodiments relate generally to electronic devices, and more specifically, to a technique for mitigating touch-to-display noise in a display system having a touch sensor screen.

BACKGROUND

Input devices including proximity sensor devices (e.g., touchpads or touch sensor devices) are widely used in a variety of electronic systems. Proximity sensor devices are often combined with display devices to operate as input-display devices (such as touch screens integrated in cellular phones). In such an input-display device, the proximity sensor device and the display device may be highly integrated. The high integration may result in parasitic capacitances between components of the proximity sensor device and components of the display device. As a result, a sensing waveform, emitted by the proximity sensor device, may capacitively couple onto signals of the display device, thereby causing display artifacts.

Some displays, such as OLED displays, have significant coupling between the touch sensor and the display, such that the touch sensor stimulation voltages can couple into the display pixels and disrupt the intended brightness for a given display line. These artifacts have been termed "touch-to-display noise" that is defined as the display noise caused by touch sensing.

SUMMARY

In general, in one aspect, one or more embodiments relate to an input-display device. The input-display device includes a display screen disposed on a display substrate, the capacitive sensing electrodes for capacitive sensing in a sensing region of the display screen, and a display controller module. The display screen includes display pixels. The display controller module includes a touch sensing controller configured to generate, during a first display frame, a first touch sensing waveform to be applied to a touch screen of a display, and generate, during a second display frame, a second touch sensing waveform to be applied to the touch screen. The first touch sensing waveform generates on the display a first touch-to-display noise pattern of touch-to-display noise artifacts, and the second touch sensing waveform generates on the display a second touch-to-display noise pattern of touch-to-display noise artifacts. The touch-to-display noise pattern mitigates the first touch-to-display noise pattern.

In general, in one aspect, one or more embodiments relate to a display controller module. The display controller module includes a touch sensing controller configured to generate, during a first display frame, a first touch sensing waveform to be applied to a touch screen of a display, generate, during a second display frame, a second touch sensing waveform to be applied to the touch screen. The first touch sensing waveform generates on the display a first touch-to-display noise pattern of touch-to-display noise artifacts. The second touch sensing waveform generates on the display a second touch-to-display noise pattern of touch-to-display noise artifacts. The second touch-to-display noise pattern mitigates the first touch-to-display noise pattern.

In general, in one aspect, one or more embodiments relate to a method for driving a display of an input-display device. The method includes generating, during a first display frame, a first touch sensing waveform to be applied to a touch screen of the display, and generating, during a second display frame, a second touch sensing waveform to be applied to the touch screen. The first touch sensing waveform generates on the display a first touch-to-display noise pattern of touch-to-display noise artifacts. The second touch sensing waveform generates on the display a second touch-to-display noise pattern of touch-to-display noise artifacts. The second touch-to-display noise pattern mitigates the first touch-to-display noise pattern.

DETAILED DESCRIPTION

The following detailed description is merely exemplary in nature and is not intended to limit the disclosed technology or the application and uses of the disclosed technology. Furthermore, there is no intention to be bound by any expressed or implied theory presented in the preceding technical field, background, or the following detailed description.

The present disclosure describes a system and a related method for avoiding the artifacts caused by touch-to-display noise using existing touch controllers, such as, for example, OLED touch controllers. Touch-to-display noise is display noise that is caused by touch sensing. The disclosed system mitigates touch-to-display noise on input-display devices, including, for example, low-temperature polycrystalline oxide (LTPO) displays, using signals from display driver integrated circuit (DDIC) to the touch sensing controller integrated circuit.

The disclosed system distinguishes between high display refresh rates (60 Hz or greater) and low display refresh rates (below 60 Hz). For the high display refresh touch-to-display noise mitigation, the disclosed system cancels out the touch-to-display noise over multiple display refreshes. For the low display refresh, the disclosed system receives information from the DDIC indicating the DDIC is about to transition to a low refresh rate mode. During the low refresh rate, the touch sensing operation uses a touch-to-display noise avoidant sensing waveform for the display refreshes that happen during low refresh rates. Once the display is no longer updating, the touch sensing resumes normal operations during the in-between time (i.e., the "Vbias" period of the display) since the display is not vulnerable to touch-to-display noise during such periods.

Input-display devices, such as touchscreens, are widely used in a variety of electronic systems. Input-display devices may include a sensing region, often demarked by a surface. In the sensing region, the input-display device determines the presence, location, motion, and/or force of one or more input objects. As used herein, touch sensing includes proximity (e.g., no contact), touch (e.g., contact on an input surface), and contact with force. Touch sensing is implemented with touch sensors. The touch sensors are electrodes that are used in performing touch sensing. Examples of touch sensing includes mutual or transcapacitive sensing and absolute or self-capacitive sensing. In one or more embodiments, an input-display device includes a display screen. The display screen may be used to display content or information to a user, and the touch sensing may enable the user to interact with the displayed content. The touch sensing may involve driving the touch sensors with a sensing waveform, e.g., a square wave. The presence of the sensing waveform on the touch sensors may cause interference in the display screen. The interference may result in display artifacts, such as darker and/or lighter regions in the display screen, e.g., in a striped pattern. In one or more embodiments, the driving of the display screen is performed in a manner compensating for the interference, such that the artifacts are reduced or avoided.

Figure 1:
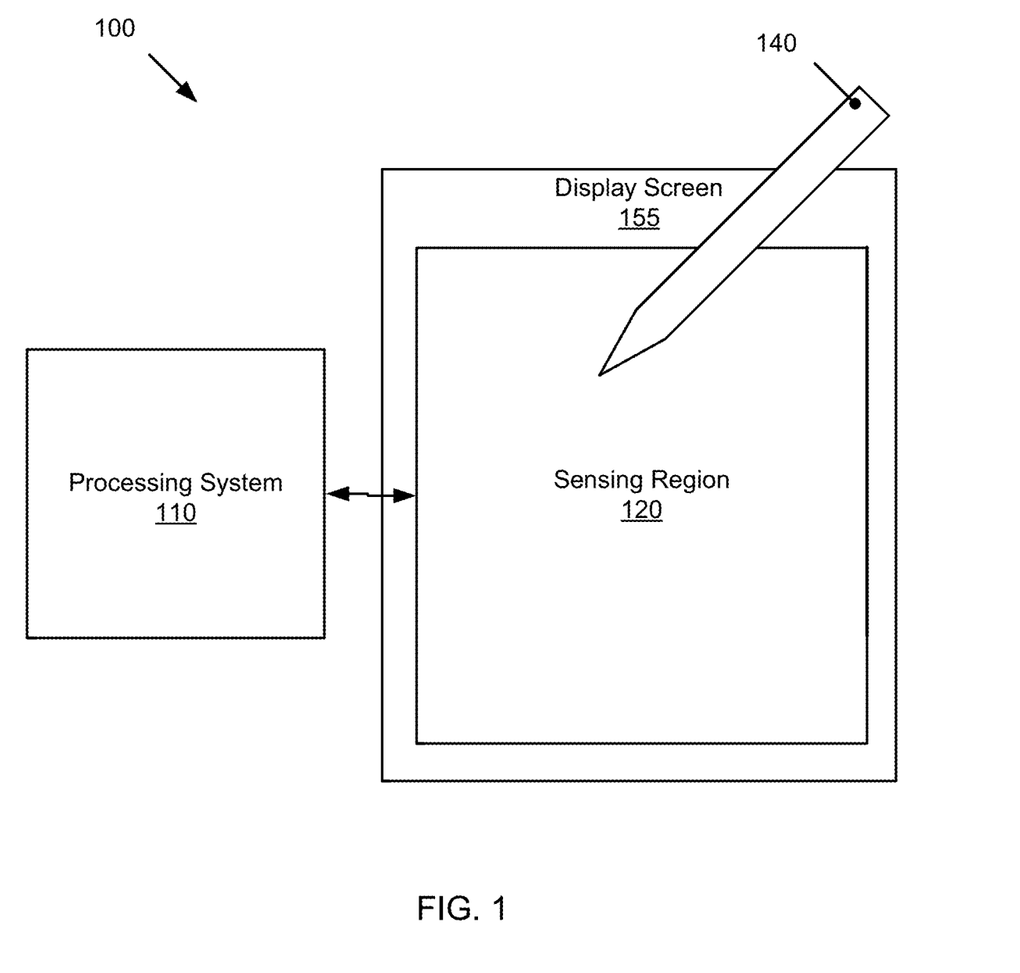
FIG. 1 shows an input display device in accordance with one or more embodiments.

FIG. 1 is a block diagram of an example of an input-display device (100), in accordance with one or more embodiments. The input-display device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), automotive infotainment devices, gaming devices, etc.

In FIG. 1, the input-display device (100) includes a proximity and/or force sensor device (e.g., "touchpad" or a "touch sensor device") configured to sense input provided by one or more input objects (140) in a sensing region (120). Example input objects include styli, an active pen, and fingers.

The sensing region (120) encompasses any space above, around, in and/or near the input-display device (100) in which the input device (100) is able to detect user input (e.g., user input provided by one or more input objects). The sizes, shapes, and locations of particular sensing regions may vary widely from embodiment to embodiment.

The input-display device (100) may utilize any combination of sensor components and sensing technologies to detect user input in the sensing region (120). The input-display device (100) includes one or more sensing elements for detecting user input. As a non-limiting example, the input-display device (100) may use capacitive techniques.

In some capacitive implementations of the input-display device (100), voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage. In various embodiments, the reference voltage may be system ground.

In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal-to-noise ratio (SNR), determine positional information of an input object, identify a gesture, determine an action to perform based on the gesture, a combination of gestures or other information, and/or perform other operations.

In FIG. 1, a processing system (110) is shown as part of the input-display device (100). The processing system (110) is configured to operate the hardware of the input-display device (100) to detect input in the sensing region (120). The processing system (110) includes parts of or all of one or more integrated circuits (ICs) and/or other circuitry components. For example, a processing system may include circuitry for mutual and/or absolute capacitance sensing. In some embodiments, the processing system (110) also includes electronically-readable instructions, such as firmware code, software code, and/or the like. In some embodiments, components composing the processing system (110)

are located together, such as near sensing element(s) of the input-display device (100). In other embodiments, components of processing system (110) are physically separate with one or more components close to the sensing element(s) of the input-display device (100), and one or more components elsewhere.

For example, the input-display device (100) may be a peripheral coupled to a computing device, and the processing system (110) may include software configured to run on a central processing unit of the computing device and one or more ICs (perhaps with associated firmware) separate from the central processing unit. As another example, the input-display device (100) may be physically integrated in a mobile device, and the processing system (110) may include circuits and firmware that are part of a main processor of the mobile device. In some embodiments, the processing system (110) is dedicated to implementing the input-display device (100). In other embodiments, the processing system (110) also performs other functions, such as driving haptic actuators, etc.

In some embodiments, the input-display device (100) includes a touch screen interface, and the sensing region (120) overlaps at least part of an active area of a display screen (155). For example, the input-display device (100) may include substantially transparent sensor electrodes overlaying the display screen and provide a touch screen interface for the associated electronic system. The display screen may be any type of dynamic display capable of displaying a visual interface to a user and may include any type of light emitting diode (LED), organic LED (OLED), microLED, liquid crystal display (LCD), or other display technology. The proximity and/or force sensor device and the display screen of the input-display device (100) may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
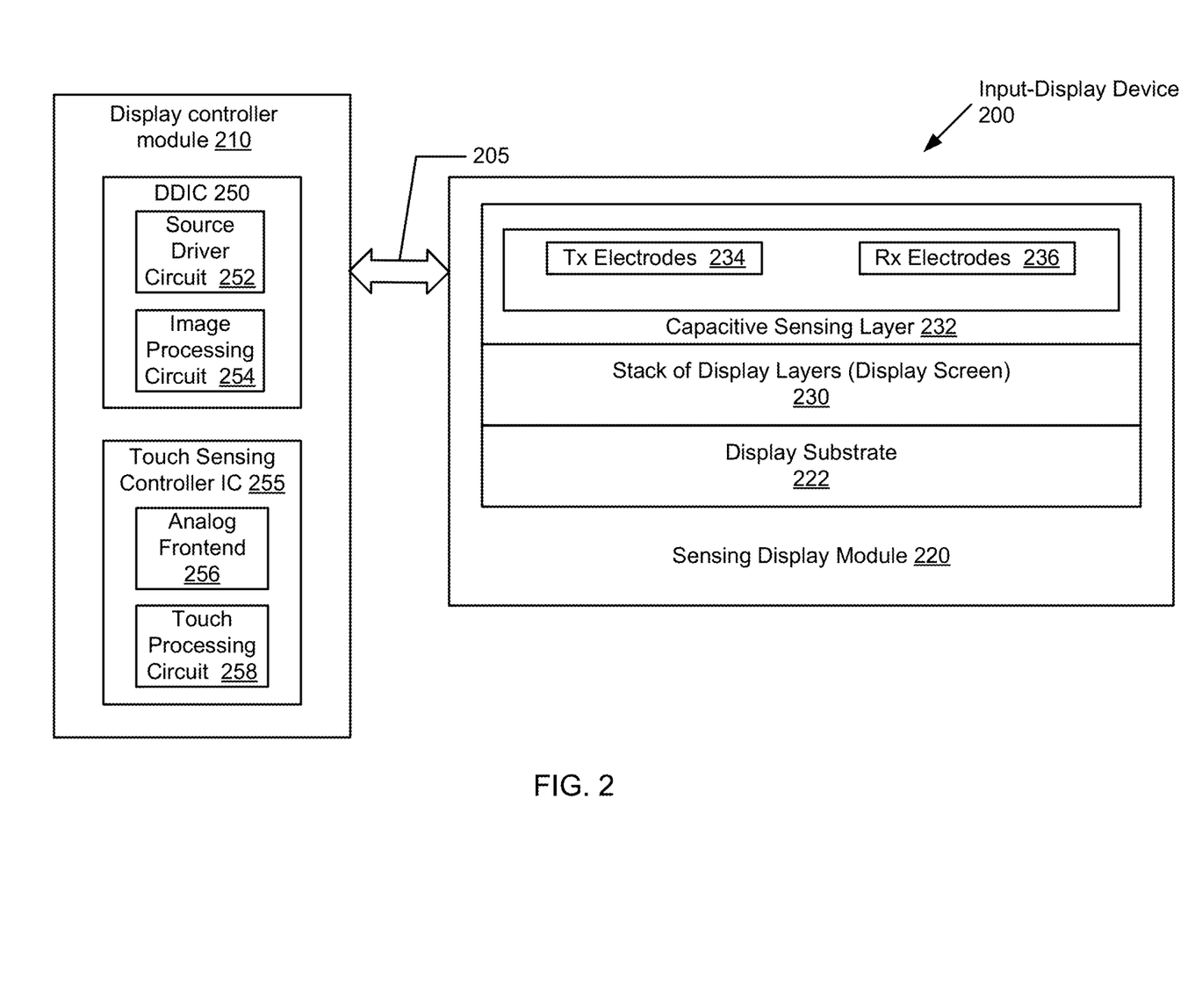
FIG. 2 shows an input display device in accordance with one or more embodiments.

FIG. 2 shows an input-display device (200) in accordance with one or more embodiments. As shown in FIG. 2, input-display device (200) comprises a display controller module (210) and a sensing-display module (220) that are coupled via routing traces (205). The sensing-display module (220) may implement all or a part of the sensing region (120) and all or a part of the display screen (155), discussed above in reference to FIG. 1.

In a first embodiment, the display controller module (210) includes a discreet display driver integrated circuit (DDIC) (250) and a discreet touch sensing controller integrated circuit (IC) (255). In a second embodiment, the display controller module (210) may include a touch and display driver integrated (TDDI) circuit that incorporates all of the functionality of the DDIC (25) and the touch sensing controller IC (225) in a single device. In the descriptions and claims that follow, the DDIC (250) may simply be referred to as "display driver 250" or "display driver". Similarly, the touch sensing controller IC (255) may simple be referred to as "touch sensing controller (255)" or "touch sensing controller".

In one or more embodiments, the sensing-display module (220) includes multiple layers, including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222). The stack of display layers (230) may include LCD display layers such as a color filter glass layer, a liquid crystal layer, and a TFT layer disposed on the display substrate (222), which may be glass.

The sensing-display module (220) may have additional layers and components. In one or more embodiments, multiple transmitter (TX) electrodes (234) and/or receiver (RX) electrodes (236) are disposed in the one or more capacitive sensing layers (232) in a sensing region of the display screen. The sensing region may span all or part of the display screen. The TX electrodes (234) and/or RX electrodes (236) may be used in capacitance sensing (e.g., absolute capacitance sensing, mutual capacitance sensing, etc.), as described above in reference to FIG. 1.

While FIG. 2 shows the capacitive sensing layer(s) (232) as being disposed on top of the stack of display layers (230), these layers may be located anywhere, relative to the stack of display layers (230). For example, one layer with RX electrodes (236) may be located on top of the stack of display layers (230), and another layer with TX electrodes (234) may be located in or below the stack of display layers (230). Alternatively, there may be no layer with TX electrodes. In one or more embodiments, the sensing module (220) includes a matrix pad sensor with numerous sensing pads and traces connecting to the sensing pads in a metal mesh layer across the sensing region. The matrix pad sensor may include at least one such metal mesh layer. Instead of using a dedicated metal mesh layer, a display layer (e.g., an OLED display cathode layer) may be patterned to serve as a metal mesh layer.

In one or more embodiments, the TX electrodes (234) and the RX electrodes (236), together, implement mutual capacitance sensing. In other words, a waveform is driven onto the TX electrodes (234) and a resulting signal(s) is received from the RX electrodes (236). The resulting signal is a function of the waveform and change in capacitance between the TX electrodes (234) and RX electrodes (236) due to the presence of an input object. In one or more embodiments, the RX electrodes (236) are operated to perform absolute capacitance sensing independent of the TX electrodes (234). In one or more embodiments, the transmitter electrodes (234) are operated to perform absolute capacitance sensing independent of the receiver electrodes (236).

In one or more embodiments, the stack of display layers (230) includes one or more layers (e.g., a thin-film transistor (TFT) layer) with source lines and gate lines and transistors for controlling the individual OLED, LCD or microLED units of the display pixels (or pixels) of the display screen.

In one or more embodiments, one or more source lines and/or one or more gate lines are also operated to perform absolute capacitance sensing.

In one or more embodiments, the DDIC (250) includes a source driver circuit (252) that drives the transistors controlling the pixels of the display screen. Each of the pixels may include an OLED pixel, a microLED pixel, a microOLED pixel, an LCD pixel, etc. The DDIC (250) may receive an image signal from a host application processor (e.g., a video processor), or any other component (not shown) that provides image content to be displayed on the display screen (155). The received image signal may be in digital form. The DDIC (250) may further include an image processing circuit (254) that may process the received image signal to output a processed image signal. For example, the image processing circuit (254) may perform a mura correction and/or other image processing operations. The processed image signal may be provided to the source driver circuit (252) where an analog signal is generated to drive the transistors associated with the pixels of the display screen, in accordance with one or more embodiments. The image processing circuit (254) may be integrated in the DDIC (250) or the image processing circuit (254) may be located elsewhere. Any kind of additional circuits related to the displaying of images may be included in the DDIC (250), without departing from the disclosure.

In one or more embodiments, the touch sensing controller IC (255) is configured to perform capacitance sensing. The touch sensing controller IC (255) may drive capacitive sensing electrodes (e.g., the TX electrodes (234) or a subset of the TX electrodes (234)) and may receive resulting signals from capacitive sensing electrodes (e.g., from the RX electrodes (236) or a subset of the RX electrodes (236)), to determine the presence and/or position of an input object (e.g., input object (140), discussed above in reference to FIG. 1). The touch sensing controller IC (255) may include various components. In one embodiment, the touch sensing controller IC (255) includes an analog frontend (256) configured to perform the capacitance sensing by driving the capacitive sensing electrodes, receiving the resulting signals, and analog-to-digital converting the resulting signals. The digital processing may be performed elsewhere, by a touch processing circuit (258), e.g., a microprocessor, digital signal processor, etc. In one embodiment, the touch sensing controller IC (255) includes some or all elements of the touch processing circuit (258). Alternatively, the touch processing circuit (258) may be located elsewhere.

In one or more embodiments of the touch and display driver integrated (TDDI) circuit, the display controller module (210) may be housed in a single semiconductor package (e.g., an application-specific integrated circuit (ASIC)). The source driver circuit (252), the image processing circuit (254), the analog frontend (256), and/or the touch processing circuit (258) may be on separate dies or on a single die, in the semiconductor package. The semiconductor package may be disposed on the display substrate (222) or elsewhere. Further, embodiments of the disclosure may include multiple TDDI circuits, each associated with a different region on the display of the sensing-display module (220).

Figure 3:
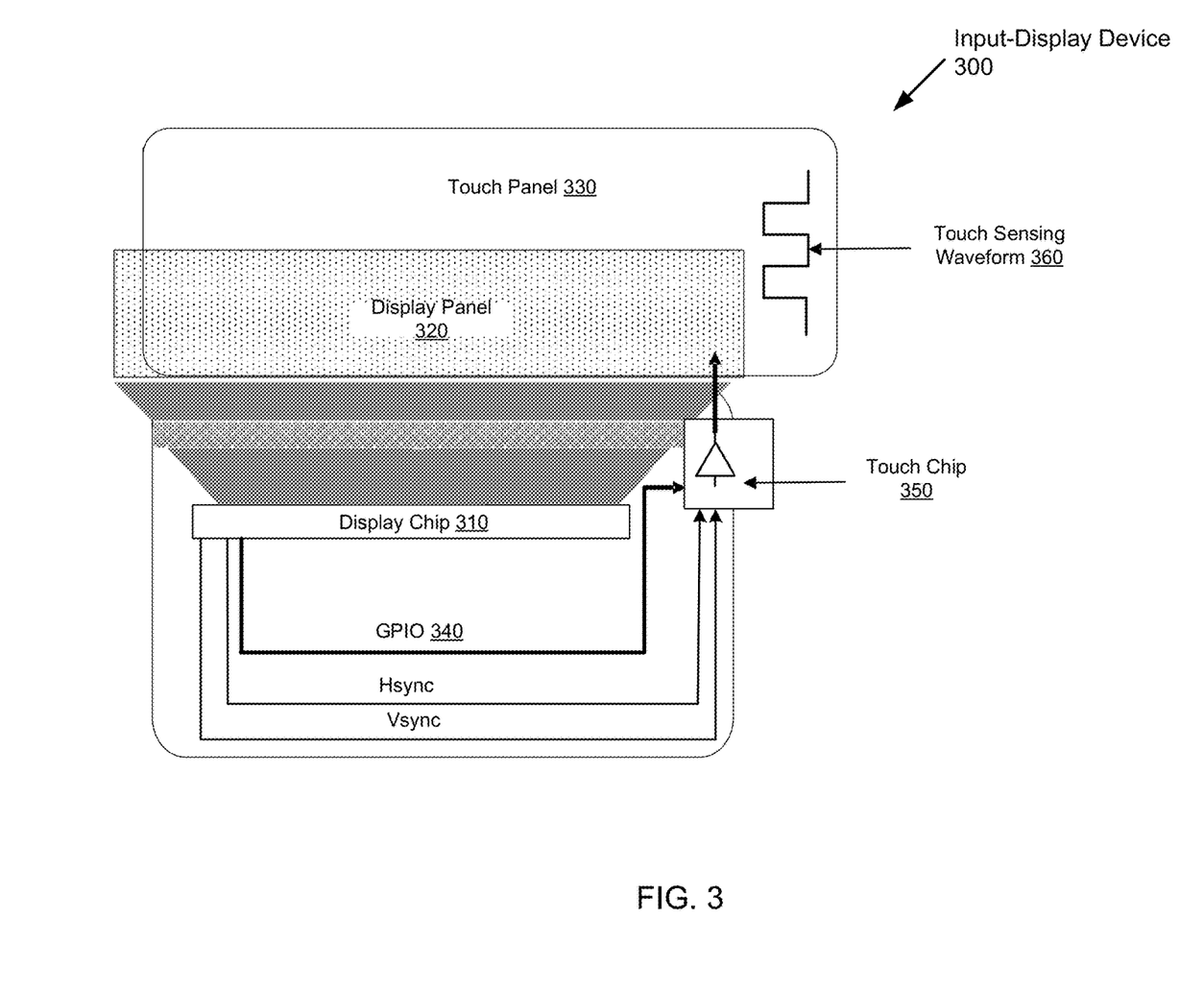
FIG. 3 shows an input display device in accordance with one or more embodiments.

FIG. 3 shows an input display device (300) in accordance with one or more embodiments. The input-display device (300) comprises a display panel (320) driven by a display chip (310) that includes a display driver (250) and a touch panel (330), driven by a touch chip (350) that includes a touch sensing controller (255), as described above in FIG. 2. The touch sensing controller (255) in touch chip (350) provides a touch sensing waveform (360) for touch sensing.

In one or more embodiments, data about the touch sensing waveform (360) is shared with the display driver (250) in display chip (310). In some embodiments of the input-display device (300), the touch sensing waveform (360) itself may be provided to the display chip (310). Accordingly, the display driver (250) in display chip (310) is aware of the timing, polarity, and amplitude of the touch sensing waveform (360) by receiving the touch sensing waveform (360). In some embodiments, the timing and polarity information may be provided by a pulse train transmitted using one or more general purpose input/output (GPIO) pin(s) 340. The display driver (250) in display chip (310) also provides a horizontal sync (Hsync) signal and a vertical sync (Vsync) signal to the touch chip 350.

Figure 4:
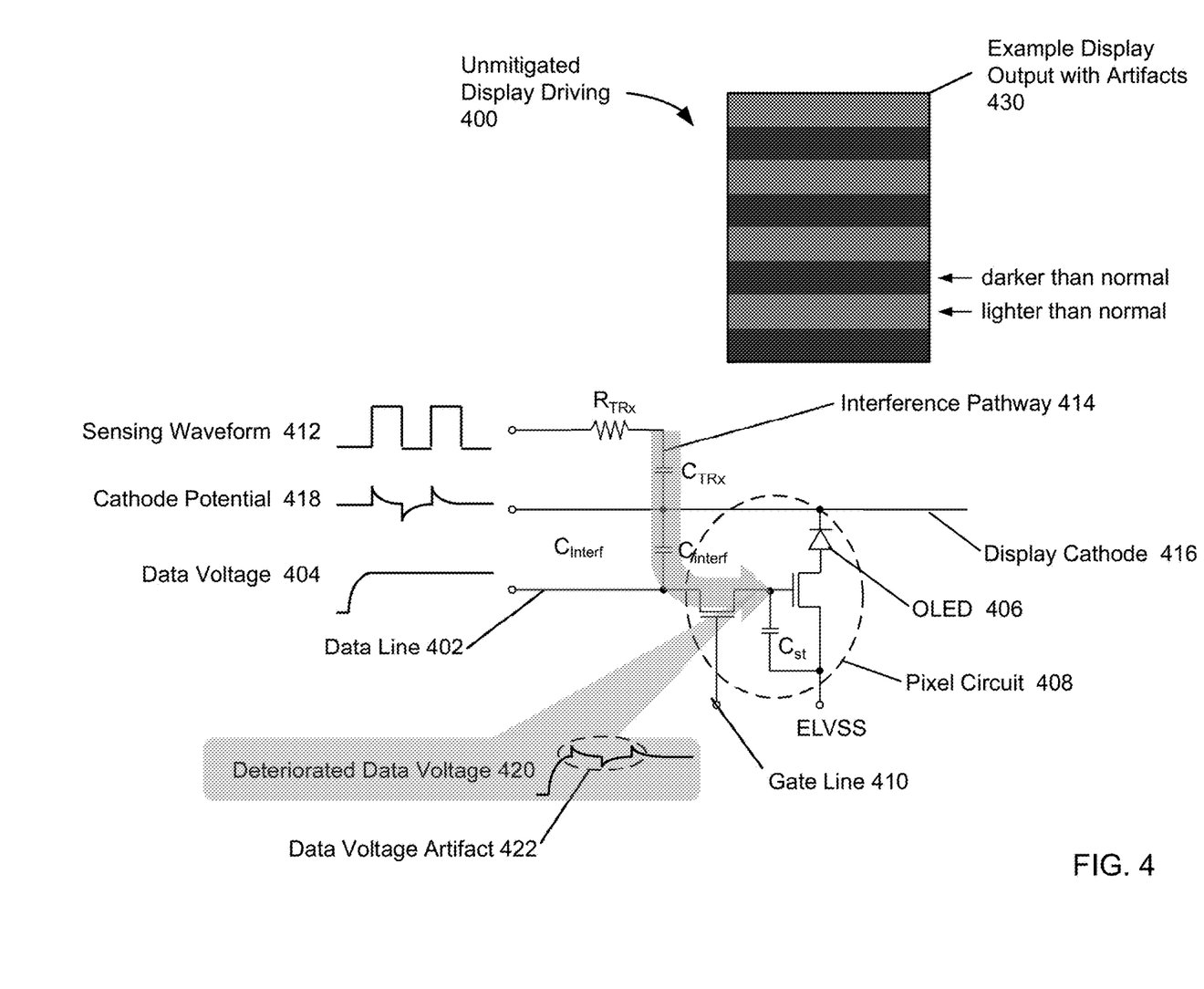
FIG. 4 shows an example of touch-to-display noise in an input display device.

FIG. 4 shows an example of touch-to-display noise in an input display device. In FIG. 4, an unmitigated noise display driving (400) is shown. An exemplary data line (402) carries a data voltage (404) for driving a pixel (e.g., a single OLED (406)). The data voltage (404) may be a square wave signal originating from the source driver circuit (252) of the DDIC (250), described in reference to FIG. 2.

Due to resistances and capacitances that are associated with the routing trace carrying the data voltage (404) to the pixel circuit (408), the data voltage (404) includes an onset transient. Upon activation of the gate line (410) of the pixel circuit (408), the data voltage (404) on the data line (402) charges a capacitor, $C_{st}$, to allow a current through the OLED (406), based on the data voltage (404). Accordingly, the output of the OLED (406) may be governed by the data voltage (404), with a higher data voltage generally resulting in an increased light output. The driving of an OLED, while illustrated for a single OLED, may be performed for all OLEDs of a display screen. Variations of the pixel circuits may be used, without departing from the disclosure. Further, other previously mentioned display technologies may be used, without departing from the disclosure.

In one or more embodiments, a touch sensing operation occurs, at least in part, simultaneously with the driving of the display. As a result, the sensing waveform (412) may capacitively couple onto the data voltage (404) at the pixel circuit (408), via an interference pathway (414) (gray arrow). The sensing waveform (412) is similar to the touch sensing waveform (360) in FIG. 3. As illustrated, the sensing waveform (412) modulates the cathode potential (418), resulting in the cathode potential waveform shown in FIG. 4, based on the RC time constant associated with, for example, $R_{TRx}$ and $C_{TRx}$. An interference capacitance, $C_{interf}$, between the cathode layer of the display (display cathode (416)) and the data line (402) may further couple the sensing waveform (412) onto the data voltage (404), thereby resulting in the deteriorated data voltage (420). The deteriorated data voltage (420) therefore includes an artifact on the data voltage (422) (e.g., a voltage fluctuation as illustrated in FIG. 4) caused by the sensing waveform (412). The artifact (422) of the deteriorated data voltage (420) may cause a fluctuation in the output of the OLED (306).

In FIG. 4, the example display output with artifacts (430) illustrates possible artifacts in the display output. In the example, the artifacts include a non-homogeneous display output comprising a touch-to-display noise pattern with rows of pixels that are lighter than normal and rows of pixels that are darker than normal. Some rows of pixels are lighter, and some rows of pixels are darker, based on the capacitors, $C_{st}$ of the OLEDs in the darker and lighter regions in the display output being charged to different voltages, as a result of the artifact (422) on the deteriorated data voltage (420). While the described effect may occur in any type of sensing display module, the effect may be particularly noticeable, and thus undesirable, in OLED-based sensing display modules (e.g., flexible, rollable and/or foldable OLED sensing display) modules where the layers (as shown in FIG. 2) are highly integrated with minimal spacing, thus resulting in increased capacitive couplings (e.g., $C_{interf}$) between conductive elements.

Further, the described effect may be particularly prominent when an absolute capacitive sensing is employed because all capacitive sensing electrodes involved in the absolute capacitive touch sensing may be modulated with the same phase. However, the effect may also be noticeable in transcapacitive sensing configurations, where only some of the capacitive sensing electrodes may be modulated or where an opposite phase modulation may be used to reduce the effect. Similarly, the effect may also be noticeable in hybrid sensing configurations which combine an absolute capacitive sensing and a transcapacitive sensing.

Figure 5:
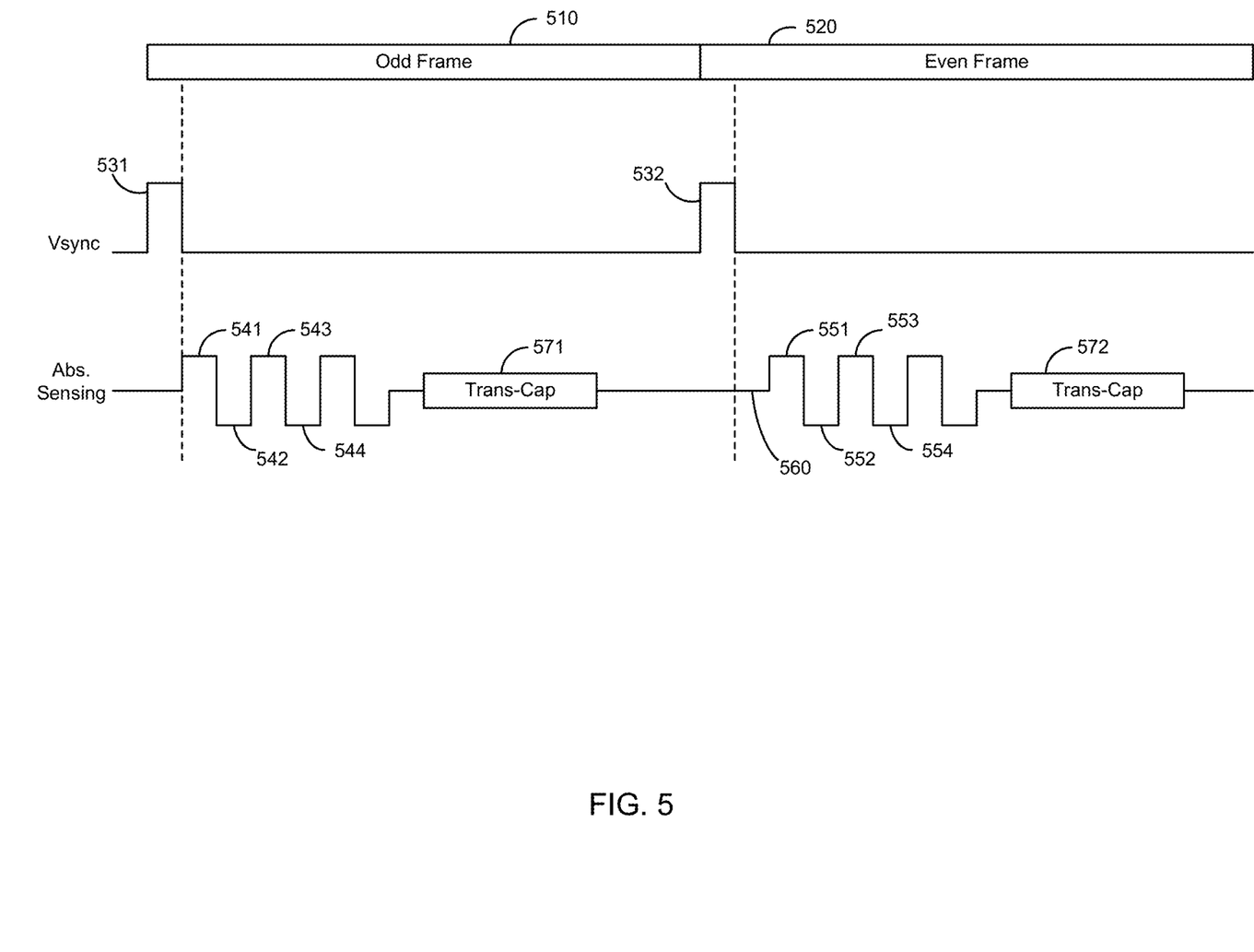
FIG. 5 shows touch-to-display noise mitigation at high frequency in accordance with one or more embodiments.

FIG. 5 shows touch-to-display noise mitigation at high frequency display refresh rate in accordance with one or more embodiments. FIG. 5 shows selected signals associated with the displaying of an odd frame (510) and an even frame (520). In an exemplary embodiment, the odd frames (510) and the even frames (520) are generated at 120 Hz. In one or more embodiments, the display driver (250) in the display chip 310 may generate timing signals such as a vertical sync (Vsync) signal, including Vsync pulse (531) and Vsync pulse (532), to start and/or end display frames, such as odd frame (510) and even frame (520). In one embodiment, the Vsync signal may additionally or alternatively identify one or more vertical blanking periods within a display frame.

The Absolute Sensing signal in FIG. 5 is similar to the touch sensing waveform (360) in FIG. 3 and the touch sensing waveform (412) in FIG. 4. The touch processing circuit (258) senses the falling edge of the Vsync pulse (531) from the source driver circuit (252) and generates the Absolute Sensing signal. Initially, a rising edge of the Absolute Sensing signal occurs at rising pulse (541), which is followed in sequence by a falling pulse (542), a rising pulse (543), and a falling pulse (544), and other pulses. Optionally, the Absolute Sensing period may be followed by a transcapacitive sensing period. However, the sequence of pulses (541-544) may cause the example display output with artifacts (430) to occur, as shown in FIG. 4. As a result, in the odd frame (510), the touch sensing waveform (360) creates a first touch-to-display noise pattern comprising rows of pixels that are lighter than normal and other rows of pixels that are darker than normal.

However, according to the principles of the present disclosure, in the even frame (520), the touch processing circuit (258) senses the falling edge of the Vsync pulse (532) from the source driver circuit (252) and generates a one-half (½) sense cycle trigger delay (560) before generating the Absolute Sensing signal, which includes a rising pulse (551), followed in sequence by a falling pulse (552), a rising pulse (553), and a falling pulse (554), and other pulses. The Absolute Sensing signal in the even frame (520) is essentially a time-delayed version of the Absolute Sensing signal in the odd frame (510). The half sense cycle trigger delay effectively creates a phase-inverted Absolute Sensing signal during the even frame (520). Thus, for example, the rising pulse (551) corresponds to the falling pulse (542) in the odd frame (510) and the falling pulse (552) corresponds to the rising pulse (543) in the odd frame (510).

As a result of the phase-inverted Absolute Sensing signal, in the even frame (520), the touch sensing waveform (360) creates a second touch-to-display noise pattern comprising rows of pixels that are darker than normal and other rows of pixels that are lighter than normal in the display output with artifacts (430) in FIG. 4. However, the second touch-to-display noise pattern in the even frame (520) is the inverse of the first touch-to-display noise pattern of dark rows of pixels and light rows of pixels in the odd frame (510). Effectively, bright touch-to-display noise artifacts in a first display refresh become dark touch-to-display noise artifacts in the second display refresh and dark touch-to-display noise artifacts in the first display refresh become bright touch-to-display noise artifacts in the second display refresh. The switching of bright and dark artifacts nets out to zero effect on brightness. Advantageously, because the refresh rate is 60 Hz or higher, the human eye cannot detect the switching of bright and dark artifacts.

Figure 6:
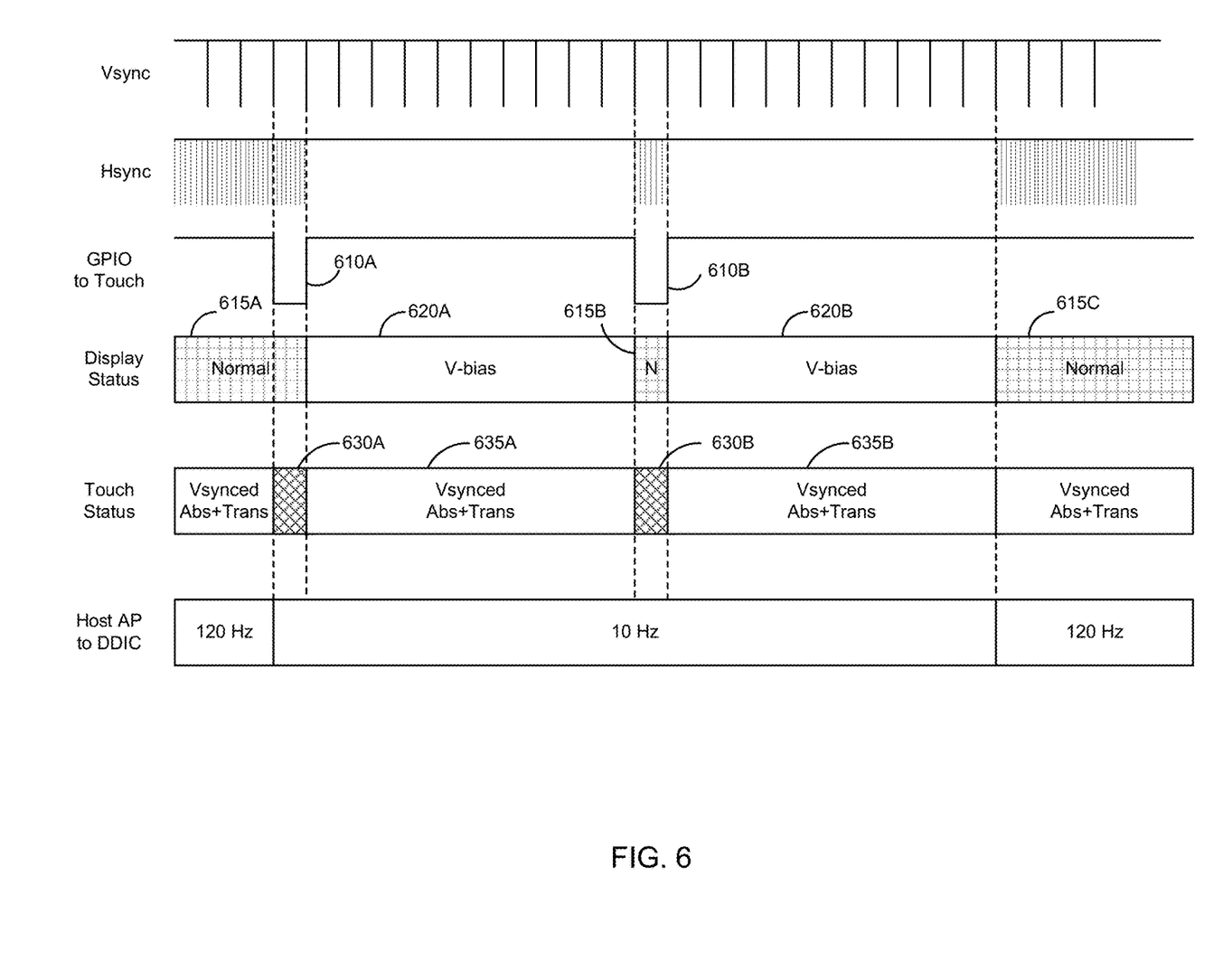
FIG. 6 shows touch-to-display noise mitigation at low frequency in accordance with one or more embodiments.

FIG. 6 shows touch-to-display noise mitigation at low frequency refresh rate (i.e., less than 60 Hz) in accordance with one or more embodiments. In an exemplary embodiment, the odd frames and the even frames are generated at 10 Hz. In FIG. 6, the display driver (250) may generate timing signals such as vertical sync (Vsync) signals and horizontal sync (Hsync) signals to start and/or end display frames and to start and/or end scan lines. However, a new GPIO signal on GPIO pin (340) is transmitted from the display driver (255) in display chip (310) to the touch controller chip (350) to indicate when display data is valid for a low display refresh rate. The GPIO signal is an active low signal, as shown by falling (or negative going) pulses (610A) and (610B).

The "Display Status" value in FIG. 6 includes "Normal" periods (615A), (615B), and (615C) during which the display rate is 120 Hz, and the display driver (250) performs gate scanning of pixel circuits, such as gate line (410) in FIG. 4. The "Display Status" value in FIG. 6 also includes the Vbias periods (620A) and (620B) during which the display refresh rate is 10 Hz and the display driver (250) in display chip (310) does not perform gate scanning.

During a low frequency refresh rate, the display driver (250) in display chip (310) asserts the GPIO signal low during a data refreshing period. The GPIO signal is a low refresh rate signal indicating that display data is valid for a low display refresh rate. When the touch sensing controller (255) in touch chip (350) detects that the GPIO signal is Low, the touch sensing controller (255) responds either by disabling touch sensing entirely or by only performing trans-capacitive sensing. The "Touch Status" value in FIG. 6 includes periods (630A) and (630B) during which the touch sensing controller (255) in touch chip (350) disables touch sensing entirely or only performs trans-capacitive sensing. The "Touch Status" value in FIG. 6 also includes periods (635A) and (635B) during which the touch sensing controller generates Absolute Sensing signals and transcapacitive sensing signals in response to the Vsync signal as shown above in FIG. 5. However, because periods (635A) and (635B) occur during the Vbias periods (620A) and (620B) during which the display driver 2350) does not perform gate scanning, the Absolute Sensing signal does not cause the example display output with artifacts (430) shown in FIG. 4 to occur.

Figure 7:
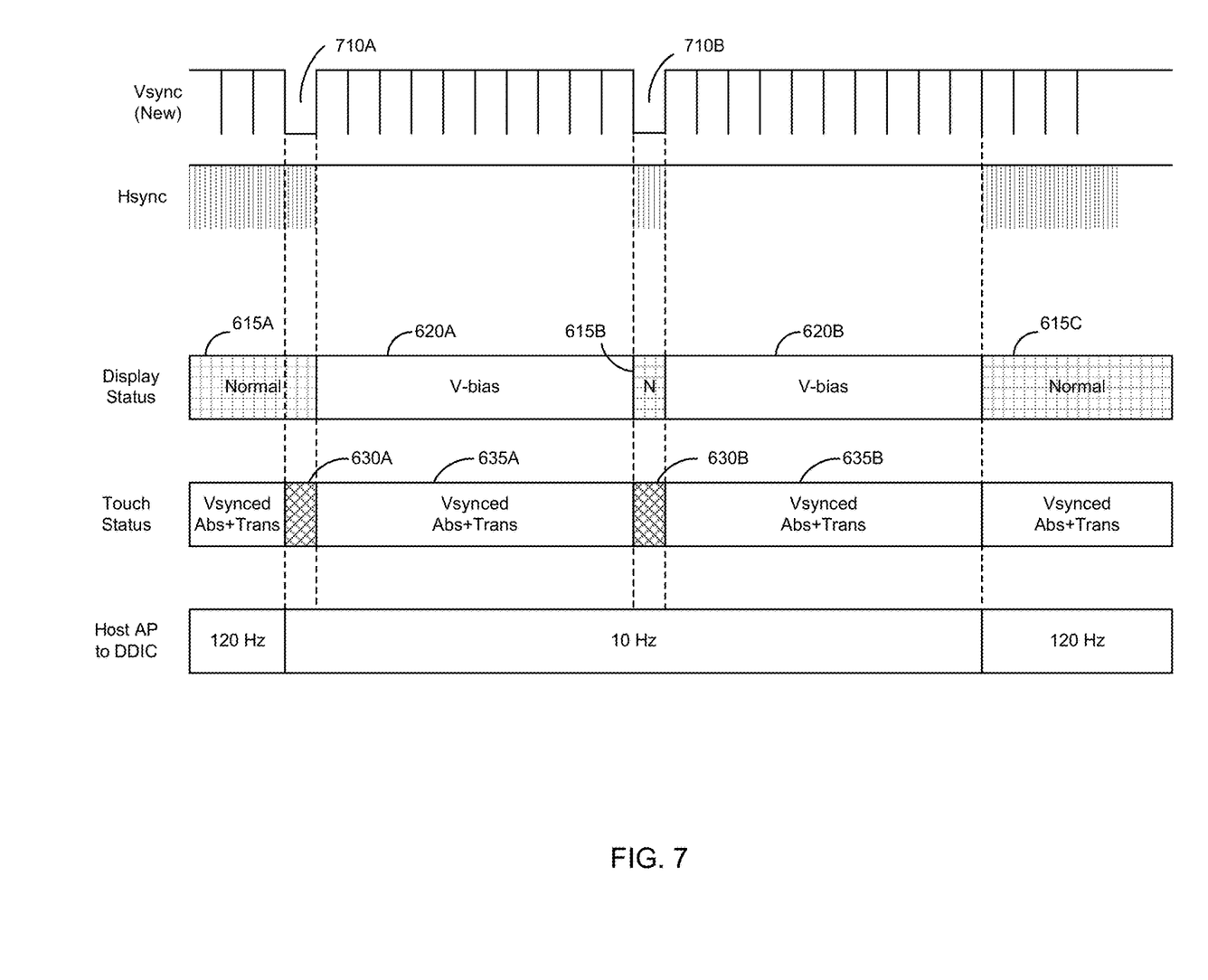
FIG. 7 shows touch-to-display noise mitigation at low frequency in accordance with one or more embodiments.

FIG. 7 shows touch-to-display noise mitigation at low frequency in accordance with one or more embodiments. FIG. 7 and FIG. 6 are similar in almost all respects. Therefore, FIG. 7 is not explained in detail to avoid redundant description. The significant difference between FIG. 7 and FIG. 6 is that, in FIG. 7, the GPIO signal has been combined with the Vsync signal to form a Vsync (New)

signal. The Vsync (New) signal includes a low signal level period 710A and a low signal level period 710B. When the touch sensing controller (255) detects that the Vsync (New) signal is low, the touch sensing controller (255) responds as in FIG. 6 above—either by disabling touch sensing entirely or by only performing trans-capacitive sensing during periods (630A) and (630B).

The disclosed system operates in different modes based on either a high display refresh rate (i.e., 60 Hz or greater) or a low display refresh rate (i.e., less than 60 Hz). For high display refresh rates, the disclosed system cancels out the touch-to-display noise over multiple display refreshes by switching the bright and dark artifacts between multiple frames so that the changes in brightness have zero effect and the switching is too fast to be detected by the human eye. For the low display refresh rates, the disclosed system receives information from the DDIC indicating the DDIC is about to enter a low display refresh rate period. During the low refresh rate period, the touch sensing circuitry uses a touch-to-display noise avoidant sensing waveform for the display refreshes that happen during low refresh rates. Once the display is no longer updating, the touch sensing resumes normal operations during the in-between time (i.e., the "Vbias" period of the display) since the display is not vulnerable to touch-to-display noise during such periods.

Embodiments of the disclosure may be suitable for implementation using a TDDI architecture, combining the source driver circuit associated with the displaying of images and the analog frontend associated with the touch sensing. Embodiments of the disclosure may also be used where the source driver circuit is separate from the analog frontend.

In the above detailed description of embodiments, numerous specific details are set forth to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. An input-display device, comprising:
a display screen disposed on a display substrate, the display screen comprising a plurality of display pixels;
a plurality of capacitive sensing electrodes for capacitive sensing in a sensing region of the display screen; and
a display controller module, the display controller module comprising:
a touch sensing controller configured to:
generate, during a first display frame, a first touch sensing waveform to be applied to a touch screen of a display, wherein the first touch sensing waveform generates on the display a first touch-to-display noise pattern of touch-to-display noise artifacts; and
generate, during a second display frame, a second touch sensing waveform to be applied to the touch screen, wherein the second touch sensing waveform generates on the display a second touch-to-display noise pattern of touch-to-display noise artifacts,
wherein the second touch-to-display noise pattern mitigates the first touch-to-display noise pattern.

2. The input-display device of claim 1, further comprising:
a display controller configured to generate during a high frequency display refresh rate a first vertical sync signal during the first display frame and a second vertical sync signal during the second display frame,
wherein the touch sensing controller is configured to:
generate the first touch sensing waveform in response to the detection of the first vertical sync signal; and
generate the second touch sensing waveform in response to the detection of the second vertical sync signal.

3. The input-display device of claim 2, wherein:
the first touch-to-display noise pattern comprises bright touch-to-display noise artifacts that are brighter than normal and dark touch-to-display noise artifacts that are darker than normal; and
the second touch-to-display noise pattern comprises bright touch-to-display noise artifacts that are brighter than normal and dark touch-to-display noise artifacts that are darker than normal,
wherein the second touch-to-display noise pattern is the inverse of the first touch-to-display noise pattern.

4. The input-display device of claim 3, wherein bright touch-to-display noise artifacts in the first touch-to-display noise pattern correspond to dark touch-to-display noise artifacts in the second touch-to-display noise pattern and dark touch-to-display noise artifacts in the first touch-to-display noise pattern correspond to bright touch-to-display noise artifacts in the second touch-to-display noise pattern.

5. The input-display device of claim 4, wherein:
the first touch-to-display noise pattern comprises a plurality of rows of pixels that are darker than normal and a plurality of rows of pixels that are brighter than normal in the display output; and
the second touch-to-display noise pattern comprises a plurality of rows of pixels that are darker than normal and a plurality of rows of pixels that are brighter than normal in the display output.

6. The input-display device of claim 1, wherein the second touch sensing waveform is a time-delayed version of the first touch sensing waveform, such that the first and second touch sensing waveforms are out of phase.

7. The input-display device of claim 1, wherein the display controller module is further configured to assert a low refresh rate signal indicating that display data is valid for a low display refresh rate and wherein the touch sensing controller is configured to detect the low refresh rate signal and, in response, to:
disable touch sensing entirely or perform only trans-capacitive sensing when the low refresh rate signal is asserted by the display controller; and perform absolute sensing when the low refresh rate signal is asserted by the display controller and the display controller is not performing gate scanning.

8. A display controller module, the display controller module comprising:
a touch sensing controller configured to:
generate, during a first display frame, a first touch sensing waveform to be applied to a touch screen of a display, wherein the first touch sensing waveform generates on the display a first touch-to-display noise pattern of touch-to-display noise artifacts; and
generate, during a second display frame, a second touch sensing waveform to be applied to the touch screen, wherein the second touch sensing waveform generates on the display a second touch-to-display noise pattern of touch-to-display noise artifacts,
wherein the second touch-to-display noise pattern mitigates the first touch-to-display noise pattern.

9. The display controller module of claim 8, further comprising:
a display controller configured to generate during a high frequency display refresh rate a first vertical sync signal during the first display frame and a second vertical sync signal during the second display frame,
wherein the touch sensing controller is configured to:
generate the first touch sensing waveform in response to the detection of the first vertical sync signal; and
generate the second touch sensing waveform in response to the detection of the second vertical sync signal.

10. The display controller module of claim 9, wherein:
the first touch-to-display noise pattern comprises bright touch-to-display noise artifacts that are brighter than normal and dark touch-to-display noise artifacts that are darker than normal; and
the second touch-to-display noise pattern comprises bright touch-to-display noise artifacts that are brighter than normal and dark touch-to-display noise artifacts that are darker than normal,
wherein the second touch-to-display noise pattern is the inverse of the first touch-to-display noise pattern.

11. The display controller module of claim 10, wherein bright touch-to-display noise artifacts in the first touch-to-display noise pattern correspond to dark touch-to-display noise artifacts in the second touch-to-display noise pattern and dark touch-to-display noise artifacts in the first touch-to-display noise pattern correspond to bright touch-to-display noise artifacts in the second touch-to-display noise pattern.

12. The display controller module of claim 11, wherein:
the first touch-to-display noise pattern comprises a plurality of rows of pixels that are darker than normal and a plurality of rows of pixels that are brighter than normal in the display output; and
the second touch-to-display noise pattern comprises a plurality of rows of pixels that are darker than normal and a plurality of rows of pixels that are brighter than normal in the display output.

13. The display controller module of claim 8, wherein the second touch sensing waveform is a time-delayed version of the first touch sensing waveform, such that the first and second touch sensing waveforms are out of phase.

14. The display controller module of claim 8, wherein the display controller module is further configured to assert a low refresh rate signal indicating that display data is valid for a low display refresh rate and wherein the touch sensing controller is configured to detect the low refresh rate signal and, in response, to:
disable touch sensing entirely or perform only trans-capacitive sensing when the low refresh rate signal is asserted by the display controller; and
perform absolute sensing when the low refresh rate signal is asserted by the display controller and the display controller is not performing gate scanning.

15. A method for driving a display of an input-display device, the method comprising:
generating, during a first display frame, a first touch sensing waveform to be applied to a touch screen of the display, wherein the first touch sensing waveform generates on the display a first touch-to-display noise pattern of touch-to-display noise artifacts; and
generating, during a second display frame, a second touch sensing waveform to be applied to the touch screen, wherein the second touch sensing waveform generates on the display a second touch-to-display noise pattern of touch-to-display noise artifacts,
wherein the second touch-to-display noise pattern mitigates the first touch-to-display noise pattern.

16. The method of claim 15, further comprising:
generating during a high frequency display refresh rate a first vertical sync signal during the first display frame and a second vertical sync signal during the second display frame,
wherein the first touch sensing waveform is generated in response to the first vertical sync signal and the second touch sensing waveform is generated in response to the second vertical sync signal.

17. The method of claim 16, wherein:
the first touch-to-display noise pattern comprises bright touch-to-display noise artifacts that are brighter than normal and dark touch-to-display noise artifacts that are darker than normal; and
the second touch-to-display noise pattern comprises bright touch-to-display noise artifacts that are brighter than normal and dark touch-to-display noise artifacts that are darker than normal,
wherein the second touch-to-display noise pattern is the inverse of the first touch-to-display noise pattern.

18. The method of claim 17, wherein bright touch-to-display noise artifacts in the first touch-to-display noise pattern correspond to dark touch-to-display noise artifacts in the second touch-to-display noise pattern and dark touch-to-display noise artifacts in the first touch-to-display noise pattern correspond to bright touch-to-display noise artifacts in the second touch-to-display noise pattern.

19. The method of claim 15, wherein the second touch sensing waveform is a time-delayed version of the first touch sensing waveform, such that the first and second touch sensing waveforms are out of phase.

20. The method of claim 15, further comprising:
asserting a low refresh rate signal indicating that display data is valid for a low display refresh rate;
detecting the low refresh rate signal and, in response:
disabling touch sensing entirely or perform only trans-capacitive sensing when the low refresh rate signal is asserted; and
performing absolute sensing when the low refresh rate signal is asserted, and the display is not performing gate scanning.

* * * * *